United States Patent
Smiles

(10) Patent No.: US 8,966,815 B1
(45) Date of Patent: Mar. 3, 2015

(54) METHOD FOR GROWING AND DISTRIBUTING LIVE FOOD

(71) Applicant: David Smiles, Tampa, FL (US)

(72) Inventor: David Smiles, Tampa, FL (US)

(*) Notice: Subject to any disclaimer, the term of this patent is extended or adjusted under 35 U.S.C. 154(b) by 0 days.

(21) Appl. No.: 14/220,998

(22) Filed: Mar. 20, 2014

(51) Int. Cl.
*A01G 31/02* (2006.01)
*A01G 9/02* (2006.01)

(52) U.S. Cl.
CPC . *A01G 9/02* (2013.01); *A01G 31/02* (2013.01)
USPC .................... 47/59 R; 47/39; 47/67

(58) Field of Classification Search
USPC ................ 47/39, 59 R, 59 S, 60, 63, 65.9, 67
IPC .................... A01G 31/06,9/02, 31/02
See application file for complete search history.

(56) References Cited

U.S. PATENT DOCUMENTS

| | | | | |
|---|---|---|---|---|
| 2,650,731 | A * | 9/1953 | Adler ........................... | 414/498 |
| 3,913,758 | A * | 10/1975 | Faircloth et al. ............... | 414/373 |
| 4,075,785 | A * | 2/1978 | Jones ................................ | 47/64 |
| 5,862,628 | A * | 1/1999 | Takashima ..................... | 47/65.8 |
| 8,365,466 | B1 * | 2/2013 | Storey ........................... | 47/62 C |
| 2011/0107667 | A1 * | 5/2011 | Laurence et al. .............. | 47/59 S |
| 2012/0005954 | A1 * | 1/2012 | Hartman ........................ | 47/65.9 |

FOREIGN PATENT DOCUMENTS

JP 2007006760 A * 1/2007
JP 2010252737 A * 11/2010

* cited by examiner

*Primary Examiner* — Rob Swiatek
*Assistant Examiner* — Kathleen Alker
(74) *Attorney, Agent, or Firm* — Nicholas Pfeifer; Smith & Hopen, P.A.

(57) ABSTRACT

The present invention is a method for growing and distributing living food crops to an intended recipient prior to harvesting that includes the utilization of a production unit to grow the food crops and a transportation cart to efficiently deliver the production units. This method prevents critical losses of nutritional content resulting from extended periods of non-consumption subsequent to harvesting. Additionally, the foods created and distributed by this method have increased aesthetic appeal to the consumer and enhanced natural taste. The novel method includes planting and growing the desired food crops in production units, transporting the production units, using a novel transportation cart, to an intended recipient once the crop reaches a predetermined ripeness, and mounting the production units at a recipient desired location. The food crops remain in the production units until ready for use, purchase, or consumption, at which point the food crops are harvested.

5 Claims, 6 Drawing Sheets

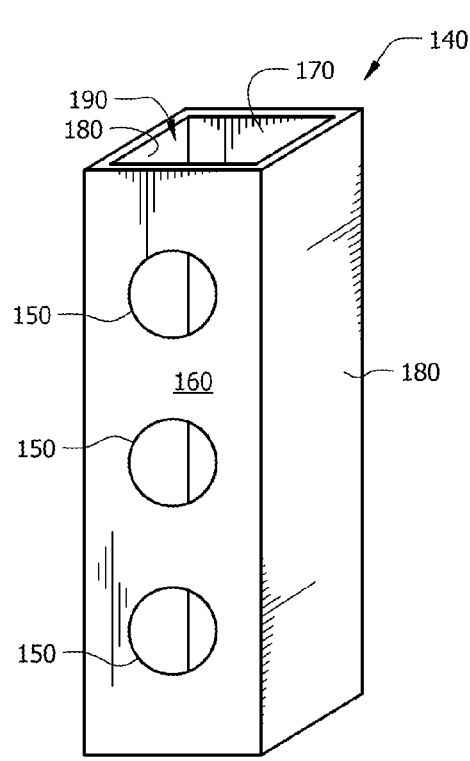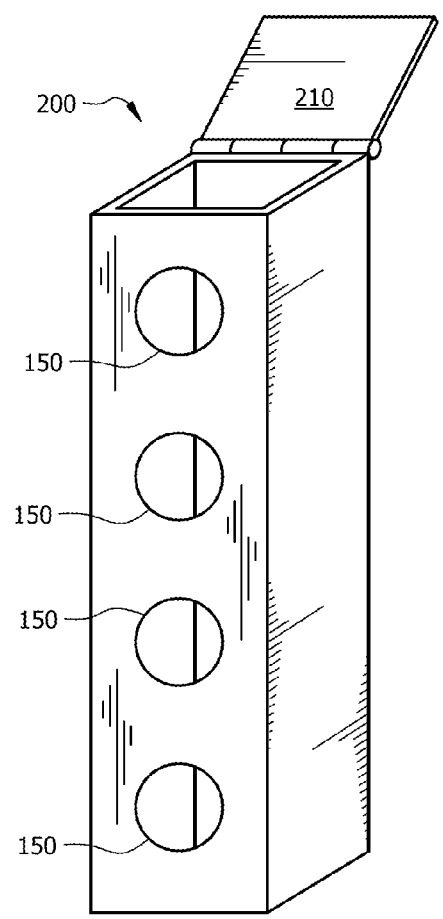
FIG. 3
FIG. 4

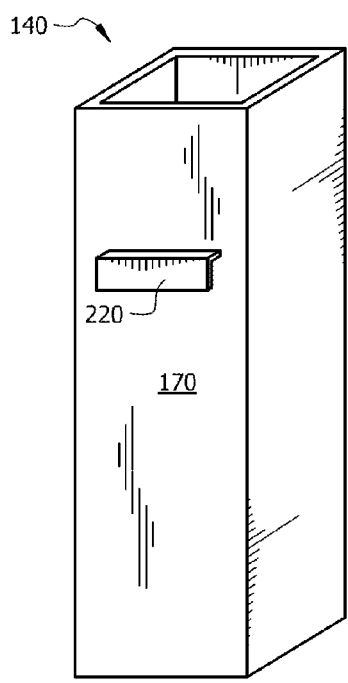
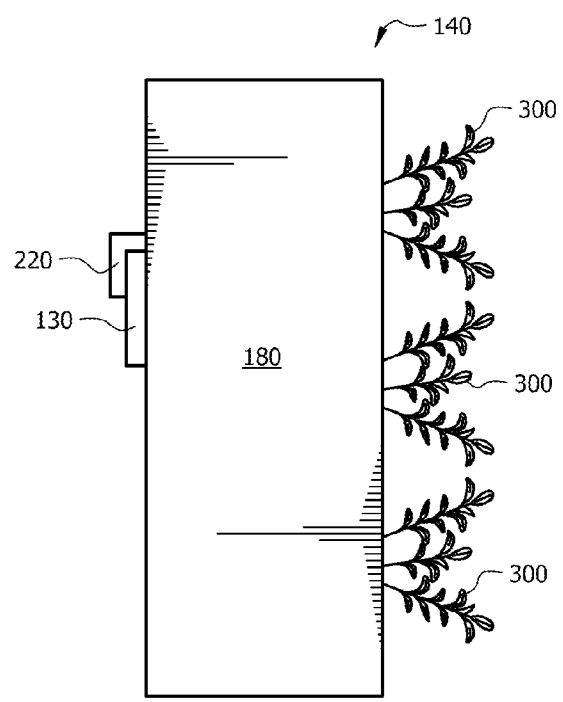
FIG. 5    FIG. 6
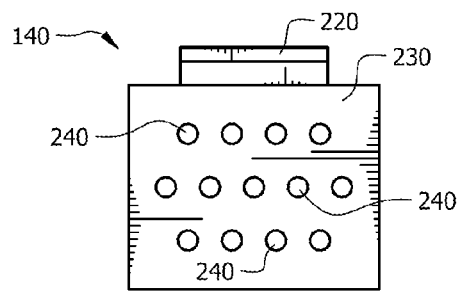
FIG. 7

METHOD FOR GROWING AND DISTRIBUTING LIVE FOOD

BACKGROUND OF THE INVENTION

1. Field of the Invention

This invention relates, generally, to food production and distribution. More specifically, it relates to growing and distributing food crops before harvesting.

2. Brief Description of the Prior Art

Recent concerns in diet-related health problems have increased the interest in the nutritional value of fruits and vegetables. According to Diane M. Barrett in *Maximizing the Nutritional Value of Fruits & Vegetables*, most food crops are subject to high respiration rates, resulting in moisture loss, quality and nutrient degradation, and potential microbial spoilage, once separated from their nutritional source.

Conventional cultivation systems lack mobility and accessibility. Accordingly, the crops must be harvested and refrigerated until delivered. This adds significant expense and reduces food quality—nutritional value and aesthetic appeal to the consumer. Accordingly, what is needed is a method for distributing food crops before harvesting. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for method of live food distribution is now met by a new, useful, and nonobvious invention.

The novel method includes planting growing a food crop in a production unit, wherein the production unit has a front wall, a back wall, two side walls, a growth medium, a growth outlet, and is adapted to be mounted in a vertical plane. Once the food crops have reached a desired ripeness, the production units containing the food crops are transported to an intended recipient. The transportation of the production units includes the use of a transportation cart having a mounting support on which the production unit may be mounted. Before mounting the production units in the recipient's display unit or hanging storage, any previously left production units lacking food crops are removed from the recipient's display unit. The just delivered production units containing the food crops are then mounted in the recipient's display unit. The mounted production units are left with the recipients and the food crops remain in the production units until harvested for use.

In a certain embodiment, the harvesting of the food crops from the production unit takes place in view of the potential consumers. Such an embodiment may also include the step of the consumer choosing the particular food crop to be harvested.

The growth medium is preferably a hydroponic medium selected from the group consisting of coconut chips, rockwool, grow rocks, and any combination of the foregoing.

In a certain embodiment, the growth of the food crops are further managed after delivery to the recipient using a subsistence management system located in an operational vicinity to the production unit.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 3 is a perspective view of a certain embodiment of the production unit.

FIG. 4 is a perspective view of another embodiment of the production unit.

FIG. 5 is a rear perspective of the production unit in FIG. 3.

FIG. 6 is a side view of the production unit in FIG. 3

FIG. 7 is a bottom view of the production unit in FIG. 3

DETAILED DESCRIPTION OF THE INVENTION

Figure 1:
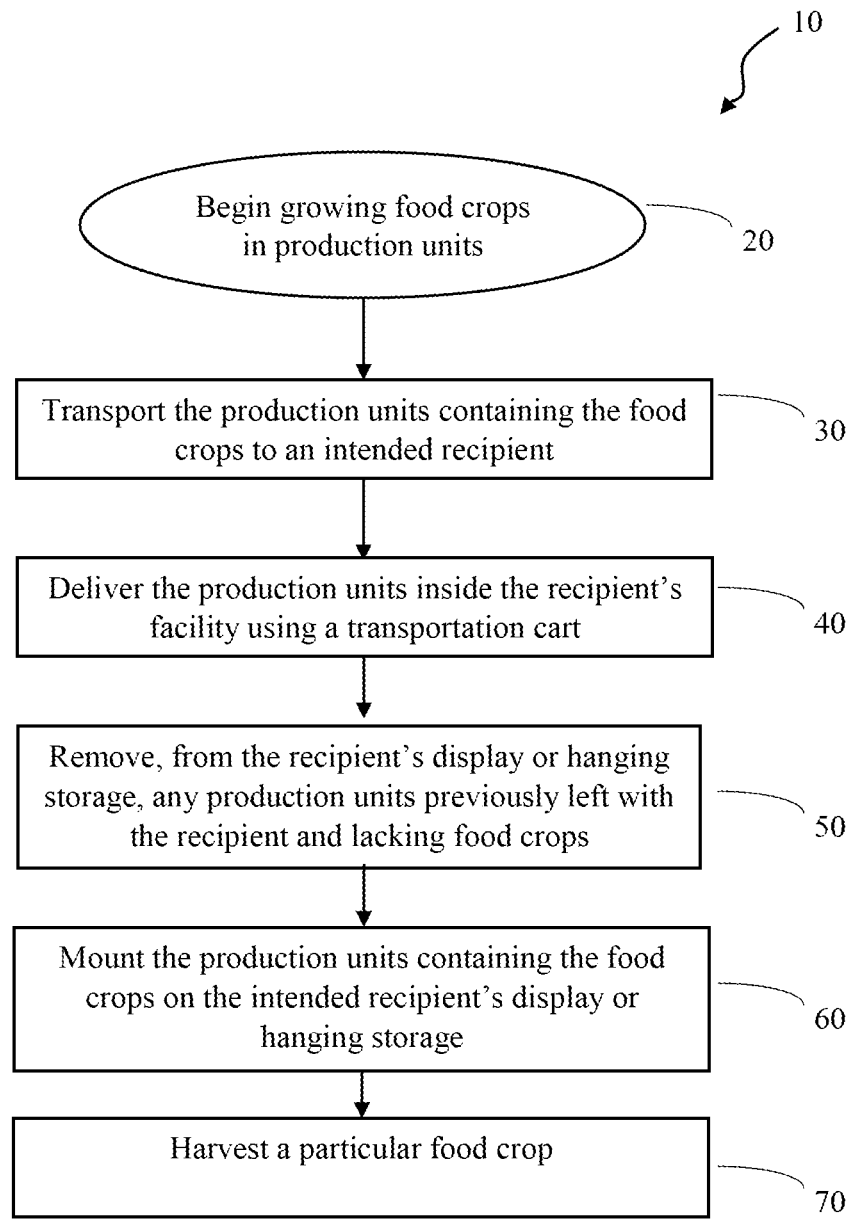
FIG. 1 is a flowchart of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a method for distributing living/growing food crops to an intended recipient prior to harvesting that utilizes a production unit to grow the food crops, a transportation cart to efficiently deliver the production units, and a display system to store the production units at the recipient's facility. The method prevents critical losses of nutritional content that results from extended periods of non-consumption subsequent to harvesting. Additionally, the foods created and distributed by this method have increased aesthetic appeal to the consumer and enhanced natural taste.

The method includes planting a predetermined food crop in the production unit. The production units are vertical food crop growing containers having a back wall, a front wall, a bottom, and two sides. The production unit is adapted, preferably with a hanger on the back wall, to be mounted in a generally vertical plane on a wall, a post, other substantially vertical, upstanding support structure. The walls create an interior in which a growing medium can be inserted. The growing medium is preferably a hydroponic medium that may include coconut chips, rock-wool, grow rocks and the like. Moreover. the growing medium is preferably a non-granular medium that will remain in the production unit during transportation and harvesting. The front wall includes at least one growth outlet providing the food crops with an opening to extend outwardly from the growing medium. The production units may include additional features to aid in the growing process as is known by a person having ordinary skill in the art, such as a drip line access and drainage apertures.

Once the food crops are planted in the production unit, the production unit is mounted on a vertical support structure. A subsistence management system is employed to optimize and sustain crop growth while the production unit is mounted in its vertical orientation. Such a system may include hydration, fertilization, aeration, illumination, and/or any other techniques for crop growth optimization known to a person having ordinary skill in the art. In a certain embodiment of the subsistence management system, the system may be smaller than the area requiring subsistence management and have therefore have the ability to travel, preferably automatically, throughout the area requiring subsistence management.

Upon the food crop reaching a predetermined ripeness or maturity, the production unit is removed from the vertical support structure and transported to an intended recipient. A unique transportation cart is used to improve the ease and speed of transportation. The transportation cart contains a mounting support allowing multiple production units to be carried in a similar vertical orientation as to when production units were mounted during the crop growing process.

The production units are hung in a vertical orientation at a predetermined location of the recipient's choosing. The production units take the place of any previously left production units that no longer contain food crops. The removed production units are placed on the transportation cart and removed from the recipient's facility.

The transportation cart improves the speed at which a delivery person can enter the recipient's facility, remove empty production units, hang the new set of production units, and exit the facility. Improving the delivery time reduces potential disruptions of the flow of recipient's business, which improves the business relationship between the recipient and the grower. The transportation cart also enables the delivery person to complete more deliveries in less time than would be possible without the transportation cart.

The food crop remains in the production unit until the food is purchased or harvested for consumption. In a certain embodiment, the production units are displayed in the recipient's facility at a location such that potential consumers of the food crops may view the food crops. Such an embodiment allows the consumer to select the particular food crop he/she may want and view the harvesting of the food crop. Consequently, the consumer knows that the harvested food is extremely fresh and never frozen.

EXAMPLE

As shown in FIG. 1, in an embodiment generally denoted by reference numeral 10, the method of distributing live food crops includes planting and growing the desired food crops in production units (step 20). The production units are transported to an intended recipient once the crop reaches a predetermined ripeness (step 30). A transportation cart is used to deliver the production units inside the recipient's facility (step 40). Any production units that were previously delivered to the recipient and are lacking food crops, are removed from a recipient's display unit (step 50). The newly delivered production units are then mounted in the recipient's display unit (step 60). The food crops remain in the production units until ready for use, purchase, or consumption, at which point one or more of the food crops are harvested (step 70).

Figure 2:
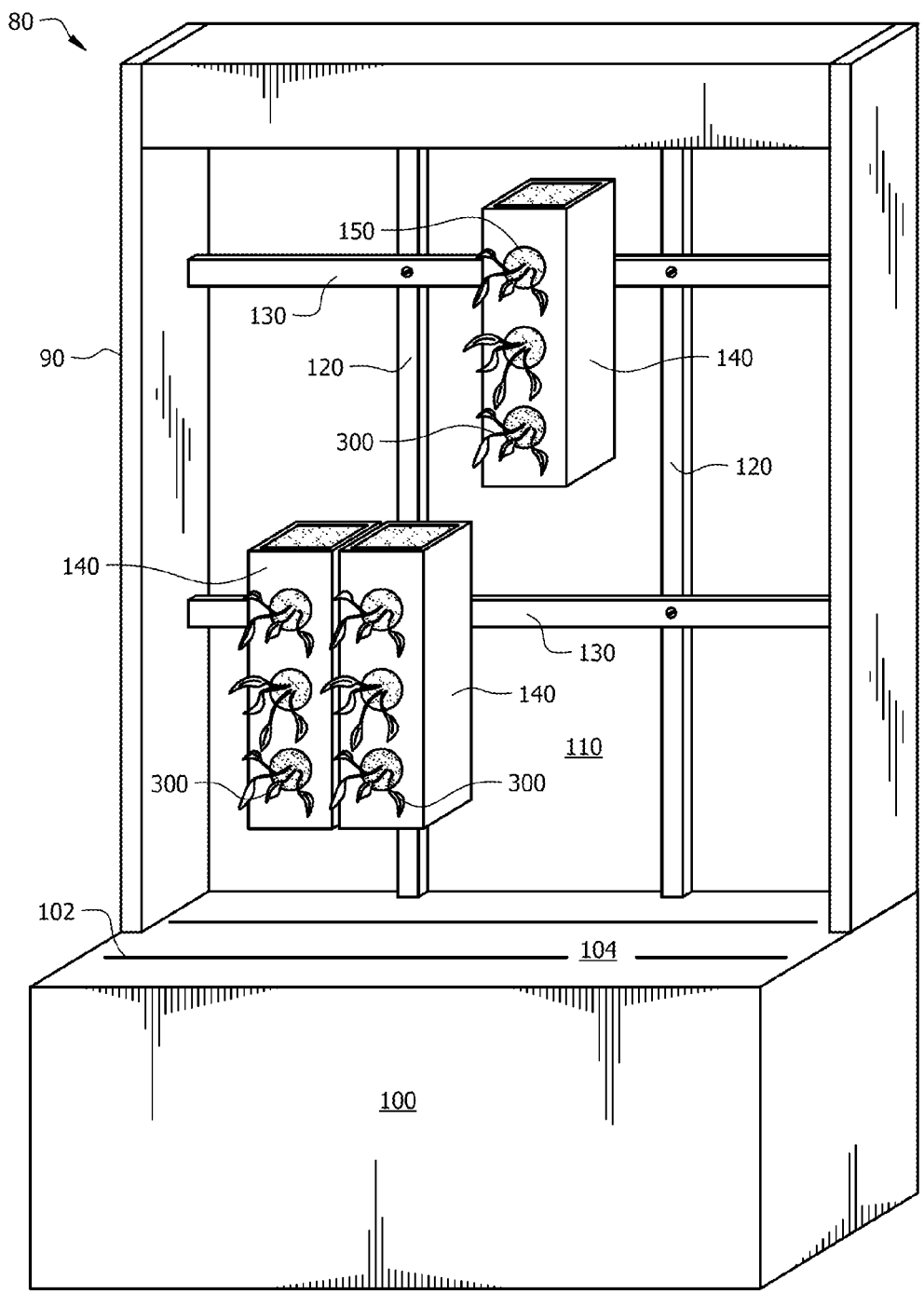
FIG. 2 is a perspective view of a certain embodiment of the production unit mounted in a certain embodiment of the display unit.

FIG. 2 illustrates a certain embodiment, generally denoted by reference numeral 80, of steps 60 and 70—mounting the production units in the display unit and leaving the food crops in the production unit until harvesting. Display unit 90 includes base portion 100 and back wall 110 on which vertical support members 120 are attached. Two horizontal beams 130 extend the length of display unit 90 and are attached on the front of vertical support members 120 resulting in a gap between horizontal beams 130 and back wall 110. The gap allows for the hangers (not shown) on the back wall of production units 140 to be mounted on horizontal beams 130. Food crops 300 grow through growth outlets 150 in production unit 140 and are displayed to potential consumers.

Base portion 100 may include slits 102 on top surface 104 of base portion 100 to collect fallen debris. Base portion 100 may also be used as a step to aid in the mounting of production units 140 and harvesting of food crops 300.

FIG. 3 provides an isolated view of an embodiment of the production unit generally denoted by reference numeral 140. Production unit 140 includes front wall 160, back wall 170, and two side walls 180. Additionally, production unit 140 contains three growth outlets 150 disposed on front wall 160. The four walls (160, 170, and 180) create interior 190 in which a growing medium can be inserted.

In a certain embodiment of the production unit, as shown in FIG. 4 and generally denoted by reference numeral 200, the production unit may include lid 210 and/or additional growth outlets 150. Certain embodiments may employ any number of growth outlets such that the number of growth outlets does not increase the size of the production unit to an unmovable size, as is known by a person having ordinary skill in the art.

FIG. 5 exemplifies a certain embodiment of hanger 220 disposed on back wall 170 of production unit 140. FIG. 6 shows hanger 220 mounted to horizontal beam 130. FIG. 7 shows bottom 230 of production unit 140. Bottom 230 contains drainage apertures 240 to allow water to exit bottom 230. In a certain embodiment, production units 140 are arranged so that any water exiting bottom 230 of a certain production unit may enter the top of a production unit mounted below the certain production unit.

Figure 8A:
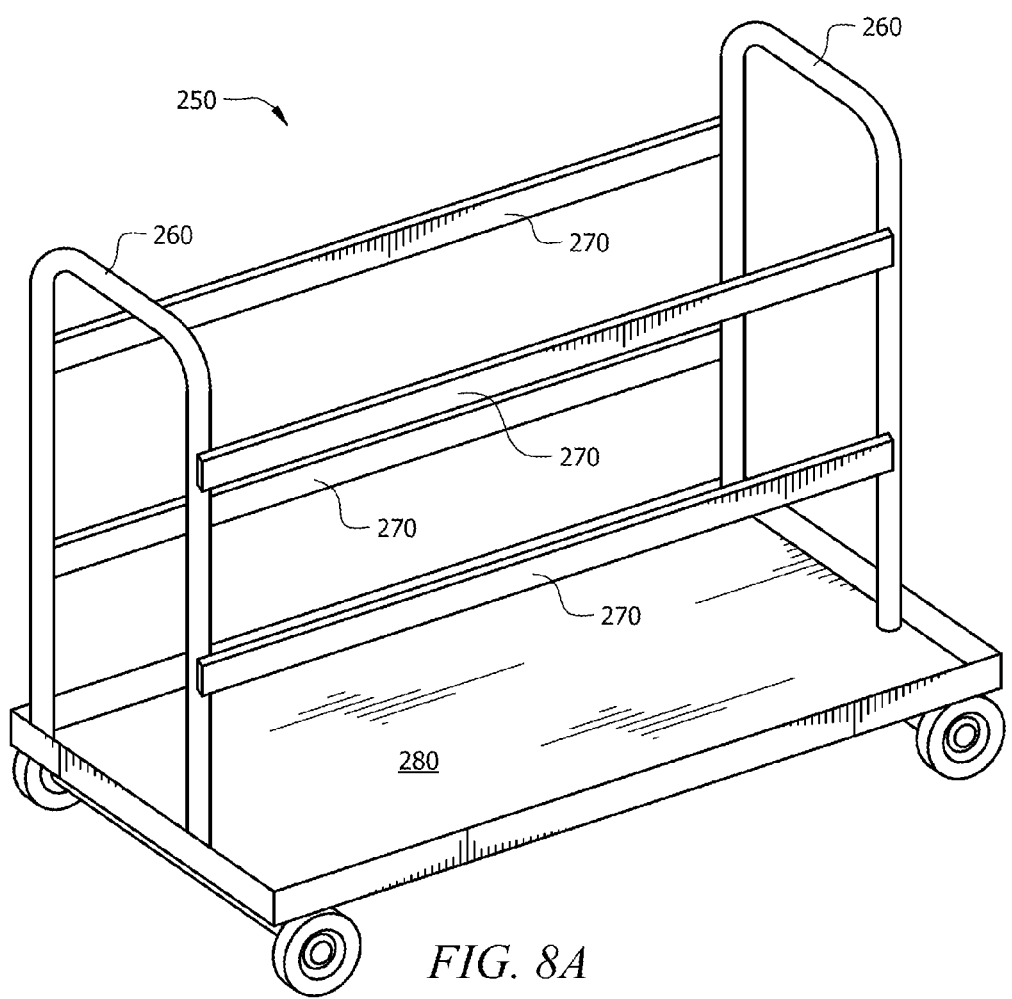
FIG. 8A is a perspective view of a certain embodiment of the transportation cart.
Figure 8B:
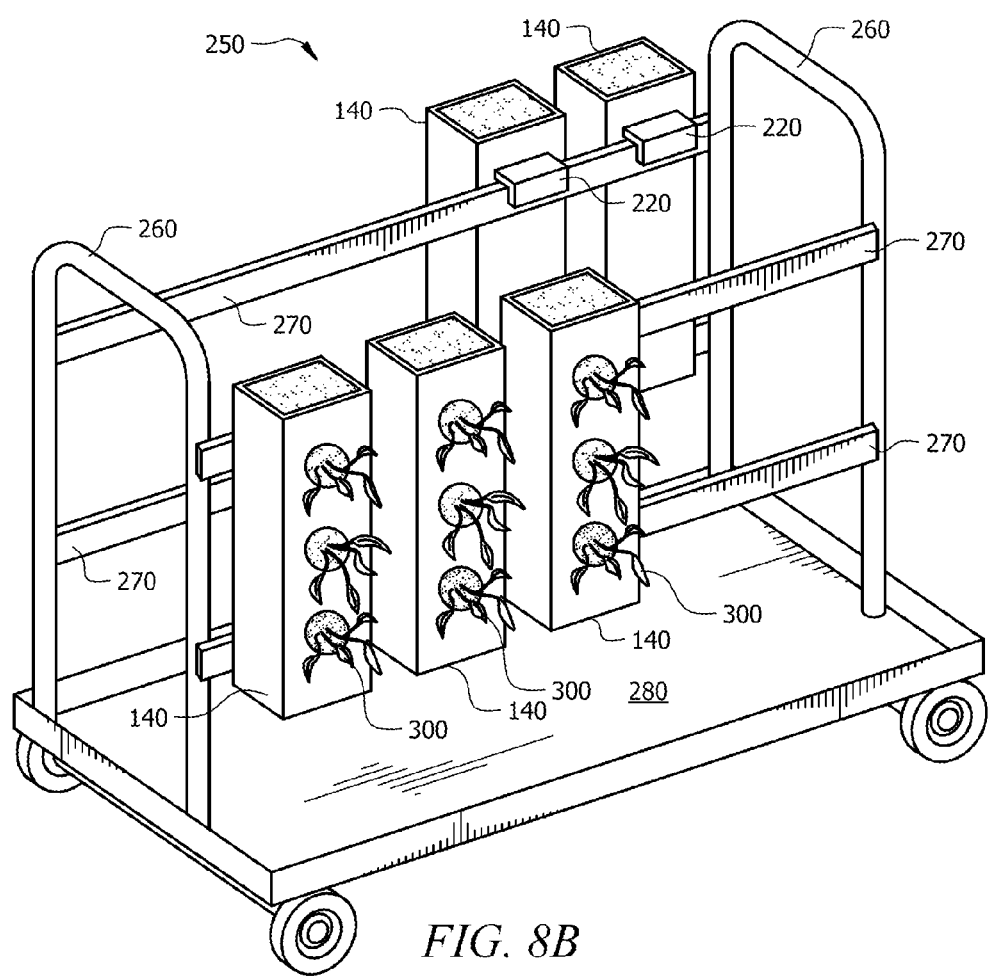
FIG. 8B is a perspective view of the transportation cart in FIG. 8A including production units mounted to the transportation cart.

FIG. 8A exemplifies a certain embodiment of the transportation cart, generally denoted by reference numeral 250, used to easily transport multiple production units. Transportation cart 250 includes handles 260 to aid in maneuvering transportation cart 250 and mounting supports 270 to mount production units 140 (see FIG. 8B). Transportation cart 250 includes base 280 to catch any falling debris from the production units. Base 280 is a crucial component to maintain the cleanliness necessary in typical food establishments. As shown in FIG. 8B, the top mounting support provides a beam on which hanger 220 can mount and the bottom mounting support prevents production units 140 from swinging off the top mounting support. In a certain embodiment, mounting supports 270 may utilize any design known to a person having ordinary skill in the art that allows one or more production units to be mounted to the transportation cart. Moreover, a certain embodiment may have additional mounting supports to secure multiple rows of production units or taller production units.

In a certain embodiments, the production unit may be any shape as long as it includes at least one growth outlet on a vertical surface. Opposite the growth outlet would include a hanger or any other mounting known to a person having ordinary skill in the art. For example, if the production unit had a cylindrical shape, a growth outlet would be preferably about 180 degrees in circumference from the mounting. However, depending on the design of the display unit, the production unit may have a hanger, or any other mounting, located on any point on the production unit such that the production unit can be mounted to the display unit with the food crop accessible and viewable to consumers and the recipient.

For example, the present invention may utilize a hanger extending from the top of the production unit. Such an embodiment of the production unit may include two sets of growth outlets on the vertical surfaces (or surface when the production unit is cylindrical) of the production unit such that the two sets are located on surfaces opposite each other (or with 180 degree in separation around the circumference of a cylindrical production unit). The display unit to accompany this production unit would likely act as a partition wall in which people could walk on both the front and back sides of the display unit. The production units would preferably mount to beams extending the length of the display unit and the production units would be oriented so that the growth outlets would be facing roughly perpendicular to the length of the display unit and therefore be accessible and visible to people on either side of the display unit.

In a certain embodiment, the display unit may have more or less horizontal beams to account for the height of the display unit and the height of the production units to maximize space. There may be multiple rows of production units or a single row of taller production units. In a certain embodiment, the vertical support members may be attached to the top and bottom of the display unit or there may be no vertical support members and the horizontal beams may be attached to the sides of the display unit.

In a certain embodiment of the transportation cart, the cart may include notches or any other structural features in the mounting supports to prevent the production units from sliding in the longitudinal direction of the cart.

GLOSSARY OF CLAIM TERMS

Growth Medium: is any state of matter that allows for the growth of crops.

Growth Outlet: is a hole or aperture in a surface of the production unit in which a crop may pass through while growing.

Hanger: is a structure on the production unit that allows the production unit to be hung from a mounting support.

Display Unit: is any structure allowing the production units to be stored in a vertical plane.

Harvesting: is an act of removing the crop from the production unit.

Production Unit: is a container or chamber in which food crops may be grown.

Subsistence Management System: is a device that maintains growth and/or life of food crops.

Transportation Cart: is a device capable of carrying a production unit.

Mounting: is any method for removably attaching one object to another object.

Mounting Support: is any structure on which an object can be mounted.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for growing and distributing live food, the method comprising:
    a) growing food crops in a plurality of production units, each production unit comprising a front wall, a back wall, two side walls, a bottom, a growth medium, at least one growth outlet in the front wall, and a hanger on the back wall allowing the production unit to be mounted in a vertical plane;
    b) providing a transportation cart having at least one mounting support from which the production units can be suspended by the hangers in said vertical plane;
    c) mounting the production units on the transportation cart by supporting them from the at least one mounting support;
    d) transporting the production units on the transportation cart to an intended recipient;
    e) removing the production units from the cart;
    f) mounting the removed production units on a display unit of the recipient, wherein the display unit and production units remain with the recipient and the food crops remain in the production units until the food crops are harvested;
    g) loading any empty production units previously left with the recipient onto the transportation cart;
    h) removing the transportation cart and empty production units;
    i) leaving the production units containing food crops with the recipient until the crops reach a predetermined ripeness; and
    j) harvesting the food crops.

2. The method as in claim 1, wherein the growth medium is a hydroponic medium selected from the group consisting of coconut chips, rock-wool, grow rocks, and any combination of the foregoing.

3. The method as in claim 1, wherein the display unit is in a predetermined location such that the plurality of production units and their respective food crops are visible to potential consumers of the food crops.

4. The method as in claim 3, wherein the harvesting of food crops from the plurality of production units is in view of the potential consumers.

5. The method as in claim 3, further comprising a step of presenting the potential consumers with an option to choose a specific food crop to be harvested.

* * * * *